(12) United States Patent
Gershen et al.

(10) Patent No.: US 7,136,266 B2
(45) Date of Patent: Nov. 14, 2006

(54) LEAKAGE CURRENT DETECTION INTERRUPTER EXTENSION CORD WITH CORD DIAGNOSTICS

(75) Inventors: Bernard J. Gershen, Centerport, NY (US); Steve Campolo, Malverne, NY (US); James Richter, Bayside, NY (US); Lester Rivera, Glendale, NY (US); David Herzfeld, Huntington, NY (US); Roger M. Bradley, North Bellmore, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 472 days.

(21) Appl. No.: 10/664,851

(22) Filed: Sep. 22, 2003

(65) Prior Publication Data

US 2004/0070899 A1 Apr. 15, 2004

Related U.S. Application Data

(63) Continuation-in-part of application No. 10/267,424, filed on Oct. 9, 2002, now abandoned.

(51) Int. Cl.
*H02H 3/00* (2006.01)
(52) U.S. Cl. ........................................ 361/42
(58) Field of Classification Search ............... 361/42, 361/49, 50
See application file for complete search history.

(56) References Cited

U.S. PATENT DOCUMENTS

| | | | | |
|---|---|---|---|---|
| 4,709,293 A | * | 11/1987 | Gershen et al. | 361/50 |
| 4,780,094 A | * | 10/1988 | Batty et al. | 439/492 |
| 4,853,822 A | | 8/1989 | Kamijo | 361/100 |
| 5,097,099 A | * | 3/1992 | Miller | 174/36 |
| 5,642,248 A | | 6/1997 | Campolo et al. | 361/42 |
| 5,700,150 A | * | 12/1997 | Morin | 439/4 |
| 6,016,244 A | | 1/2000 | Gershen et al. | 361/50 |
| 6,323,652 B1 | * | 11/2001 | Collier et al. | 324/508 |
| 6,525,914 B1 | * | 2/2003 | Legatti | 361/42 |
| 6,693,779 B1 | * | 2/2004 | DiSalvo | 361/42 |

* cited by examiner

*Primary Examiner*—Stephen W. Jackson
*Assistant Examiner*—Boris Benenson
(74) *Attorney, Agent, or Firm*—Paul J. Sutton

(57) ABSTRACT

In the present invention the basic detection and interruption components of an Immersion Detection Circuit Interrupter (IDCI), in combination with the line, neutral and shield conductors of an extension or appliance cord provides a new improved type of detector, a Leakage Current Detector Interrupter (LCDI) which interrupts current to a load when current leakage is detected between the line or neutral conductors of the cord and the shield conductor. The new improved LCDI detector provides, either singularly or in combination, the following advantages: Prevents the LCDI from being reset should the device become inoperative (reset lockout); Provides an indication of the integrity of the shield in the extension or appliance cord; Tests the integrity of the shield within the extension or appliance cord, in addition to testing the functionality of the LCDI; Interrupts current to the load if an electrical connection is detected between the shield and neutral, or the shield and ground, in addition to the existing detection of leakage current from the phase conductor; Allows the LCDI to trip during an open neutral condition by utilizing the ground connection as a return wire for the trip coil; and/or Provides immersion detection at the receptacle end of the extension cord in addition to protection from leakage faults.

15 Claims, 13 Drawing Sheets

PRIOR ART IDCI CIRCUIT

LEAKAGE CURRENT DETECTION INTERRUPTER EXTENSION CORD WITH CORD DIAGNOSTICS

CONTINUATION-IN-PART APPLICATION

The present application is a continuation-in-part of applicants' U.S. patent application Ser. No. 10/267,424, filed Oct. 9, 2002 now abandoned and entitled "LEAKAGE CURRENT DETECTION INTERRUPTER EXTENSION CORD WITH CORD DIAGNOSTICS AND/OR INADVERTENT GROUND TO NEUTRAL DETECTION".

BACKGROUND OF THE INVENTION

1. Field of the Invention

The invention is directed generally to electrical extension cords and power supply cords and, more specifically, to electrical extension and power supply cords having built in safety protection and diagnostics.

2. Description of the Prior Art

The electrical extension cord in use today includes a plug, usually comprising two or three prongs, an electrical conducting cord typically comprising two or three insulated wires several feet in length and a terminal connector or receptacle for receiving one or more electrical plugs to power lamps, a television, household appliances, an air conditioner, etc. A grounded extension cord includes a plug having three prongs and a three conductor insulated wire cord where two conductors are utilized for phase and neutral or return power and the third conductor is used as a common ground. While extension cords provide many advantages, there are some disadvantages that are also associated with their use. For example, extension cords are often left underneath rugs where they are trampled upon, or they are pinched by doors and furniture which can lead to arcing or short circuiting which can cause a fire. Extension cords also frequently tend to be left coiled where heat can concentrate, or are overloaded to the point of destruction by fire. Given the number of dangerous situations which can develop pursuant to extension cord use and abuse, such as residential fires and electrical shock, an extension cord design which offers some protection in anticipation of homeowner/user abuse is desired.

U.S. Pat. No. 5,642,248 assigned to Leviton Manufacturing Co., Inc. discloses an electrical extension cord where the insulated phase, neutral and ground conductors are surrounded by a braided sensing shield. The braided shield is electrically connected at the receptacle to the ground conductor and extends to the plug. Leakage current released from the conductors may be collected in the shield and detected by a Ground Fault Circuit Interrupter (GFCI). The purpose of the shield is to capture any type of leakage current within the extension cord and transfer it to ground such that the GFCI may detect the current imbalance and interrupt the circuit. This type of device is commonly known as a Leakage Current Detector Interrupter (LCDI).

Present day GFCI based leakage current detectors have several limitations. One such limitation is that of being a relatively expensive and complex device which requires the use of one or more toroidal transformers to function. These transformers can be very large for high current applications. In addition, presently available devices require that a ground be available at the outlet that the leakage current detector is plugged into. This may not always be the case in residential circuits, and some applications, such as hospitals, require a floating ground.

Two other problems are inherent in circuit interrupting devices of various manufacturers presently available that can be plugged into household outlets. One such problem is that it may be possible to reset a circuit interrupting device to provide power when the fault detecting and interrupting circuitry is no longer functioning. It is here noted that this problem has been addressed and solved in GFCIs manufactured by Leviton Manufacturing Co., Inc. of Little Neck, N.Y. With the Leviton device, known in the industry as a reset lockout GFCI, the main contacts cannot be closed when the device fails to operate the interrupting mechanism.

Another problem that can occur is when a device is plugged into an outlet in such a way that electricity is supplied to the phase terminal but not to the neutral terminal. When this happens the interrupting device is not powered and therefore can not operate because there is no return or neutral circuit. But, high voltage is still available to the user and, therefore, a potentially dangerous situation can exist. Relays that are non-latchable and normally open contact are typically used to prevent high voltage being available to the user when this type of open neutral condition exists. The normally open relay will not close the contacts unless a return circuit is available, and will open if the neutral circuit should open. However, this type of relay is relatively large and consumes a large amount of power.

It is now a requirement that window air conditioners be protected with a Leak Current Detector Interrupter (LCDI). Therefore, what is needed is an extension cord that contains diagnostics which can indicate if the extension cord is safe to connect a window air conditioner to a wall outlet and an extension cord having a plug which contains circuitry which interrupts the flow of current through the cord if an unsafe leakage current condition should arise. What is also needed is an LCDI that cannot be reset if it is non-functional, that can either indicate an open neutral condition or has the ability to interrupt the circuit during an open neutral condition, and an LCDI that meets these needs with minimal circuitry and power consumption so that it can be fitted into a small form factor.

SUMMARY OF THE INVENTION

In the present invention the basic detection and interruption components of an Immersion Detection Circuit Interrupter (IDCI), in combination with the line, neutral and shield conductors of an extension or appliance cord provides a new improved type of detector, a Leakage Current Detector Interrupter (LCDI) which interrupts current to a load when current leakage is detected between the line or neutral conductors of the cord and the shield conductor. The new improved LCDI detector provides, either singularly or in combination, the following advantages: Prevents the LCDI from being reset should the device become inoperative (reset lockout); Provides an indication of the integrity of the shield in the extension or appliance cord; Tests the integrity of the shield within the extension or appliance cord, in addition to testing the functionality of the LCDI; Interrupts current to the load if an electrical connection is detected between the shield and neutral, or the shield and ground, in addition to the existing detection of leakage current from the phase conductor; Allows the LCDI to trip during an open neutral condition by utilizing the ground connection as a return wire for the trip coil; and/or Provides immersion detection at the receptacle end of the extension cord in addition to protection from leakage faults.

Other objects and features of the invention will be pointed out in the following description and claims and illustrated in the accompanying drawings, which disclose, by way of example, the principles of the invention, and the best mode, which is presently contemplated for carrying them out.

BRIEF DESCRIPTION OF THE DRAWING

In the drawings in which similar elements are given similar reference characters.

DETAILED DESCRIPTION OF THE PREFERRED EMBODIMENT

Figure 1:
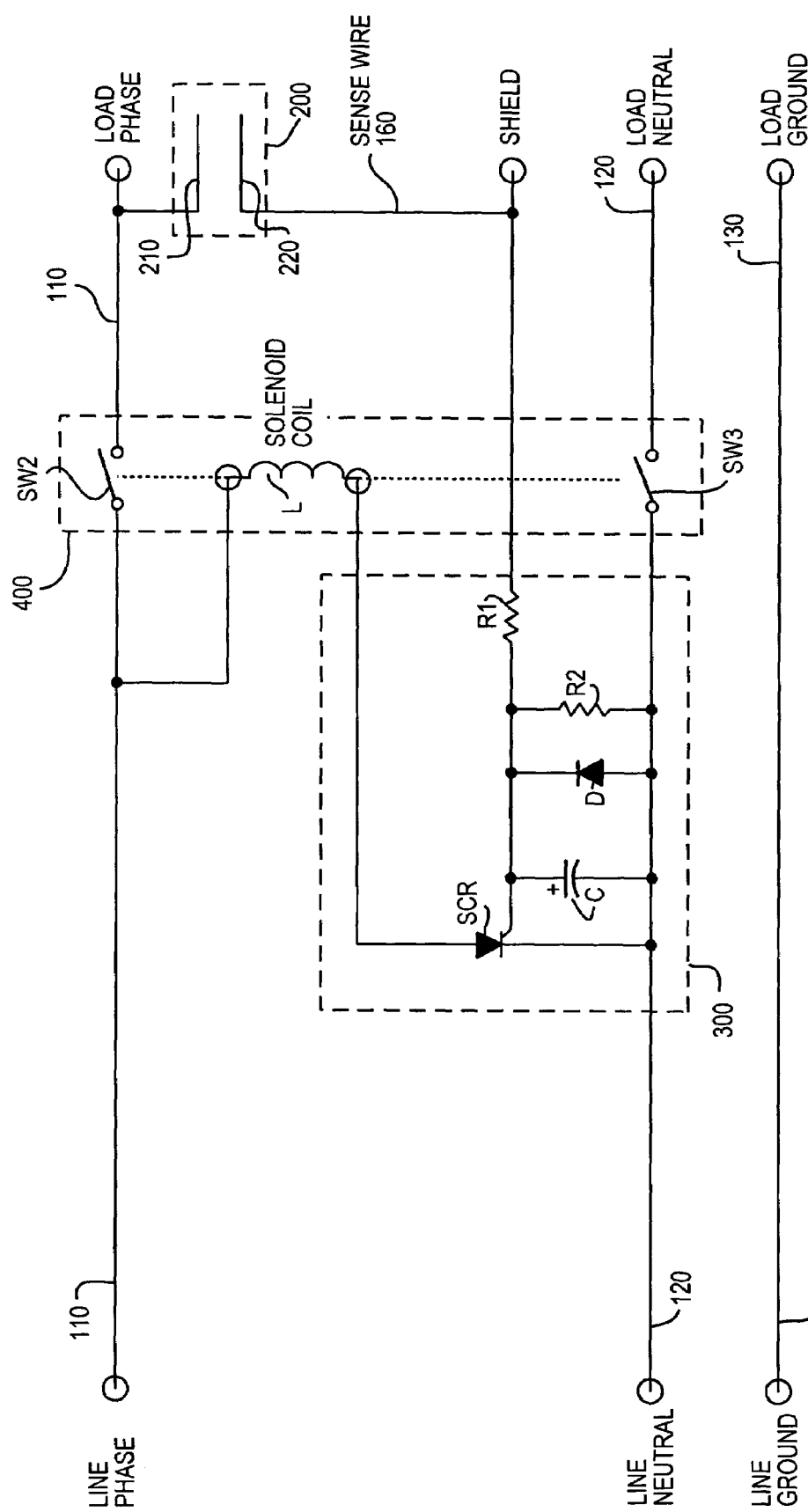
FIG. 1 is a diagram of a prior art ICDI circuit located in a plug.

Referring to FIG. 1, there is illustrated a schematic diagram of a prior art Immersion Detection Circuit Interrupter (IDCI) circuit which provides shock hazard protection for water related shock hazard conditions within small electrical appliances connected to an AC source of 110–120 volts such as, for example, a hand held hair dryer as disclosed in U.S. Pat. No. 6,016,244 assigned to Leviton Manufacturing Co., Inc., and which is incorporated herein by reference in its entirety. In FIG. 1, electrical conductors 110, 120 are respectively connected to an AC source. A pair of hazard or immersion detection conductors 210, 220 are positioned in a non-contacting relationship within the device that is to be protected such as the hair dryer. The conductors are preferably located in proximity to a port of the appliance to be protected where water can enter.

One end of immersion detection conductor 210 is operatively connected to the phase conductor of an AC source via electrical conductor 110, and one end of the second immersion detection conductors 220 is connected to the sense wire 160. The other ends of the immersion detection conductors 210, 220 are unconnected and maintained in a spaced apart relationship. Immersion of conductors 210, 220 in water creates a conductive path between the two conductors. Control circuit 300 comprises a solid state switching control circuit and includes a first resistor R1 connected in-line between the gate of a Silicon Controlled Rectifier (SCR) and the source end of the sense wire 160. Resistor R1 limits the current applied to the gate of the SCR. The control circuit 300 includes a parallel network comprising resistor R2, capacitor C and diode D connected between the gate and cathode terminals of the SCR. These components provide a measure of noise immunity and protection against damage across the gate to cathode junction of the SCR.

Interrupter circuit 400 comprises an electrical circuit for interrupting the flow of current and includes an energizing coil L, a first switch SW2 connected in-line with conductor 110 and a second switch SW3 in-line with conductor 120. Switches SW2 and SW3 are mechanically latched closed but are also responsive to the flow of current through energizing coil L and are closed when such current is not flowing. In response to the flow of such current, SW2 and SW3 switch from the normally closed position to the shock hazard condition open position. When current flows through energizing coil L its magnetic field moves a plunger which unlatches SW2 and SW3. The cathode terminal of the SCR is operatively connected to electrical conductor 120.

The immersion of both unconnected ends of the pair of immersion detection conductors 210, 220 causes the electrical AC source to be operatively connected to the gate of the SCR via the path provided by electrical conductor 110, immersion detection conductor 210, the electrically conducting path provided by the water in which the unconnected ends of the immersion detection conductors 210, 220 are immersed, immersion detection conductor 220, electrical conductor 160, and resistor R1. In response thereto, the SCR switches from the normally non-conducting state to the shock hazard condition conducting state, thereby providing a path for current to flow through energizing coil L causing switches SW2 and SW3 to switch from the normally closed position to the shock hazard condition open position and thus operatively disconnect the AC source from the electrical appliance.

Electrical conductors 110, 120 and 130 comprise a three wire conductor having an AC source compatible plug at the source end, the control circuit 300 and interrupter circuit 400 contained in the plug, and the detector 200 contained within the appliance. Exemplary values for the circuit illustrated in FIG. 1 are as follows: R1 is 2000 ohms, R2 is 1000 ohms, C is 0.1 microfarads, D is IN4004 and the SCR is 2N5064.

Figure 2:
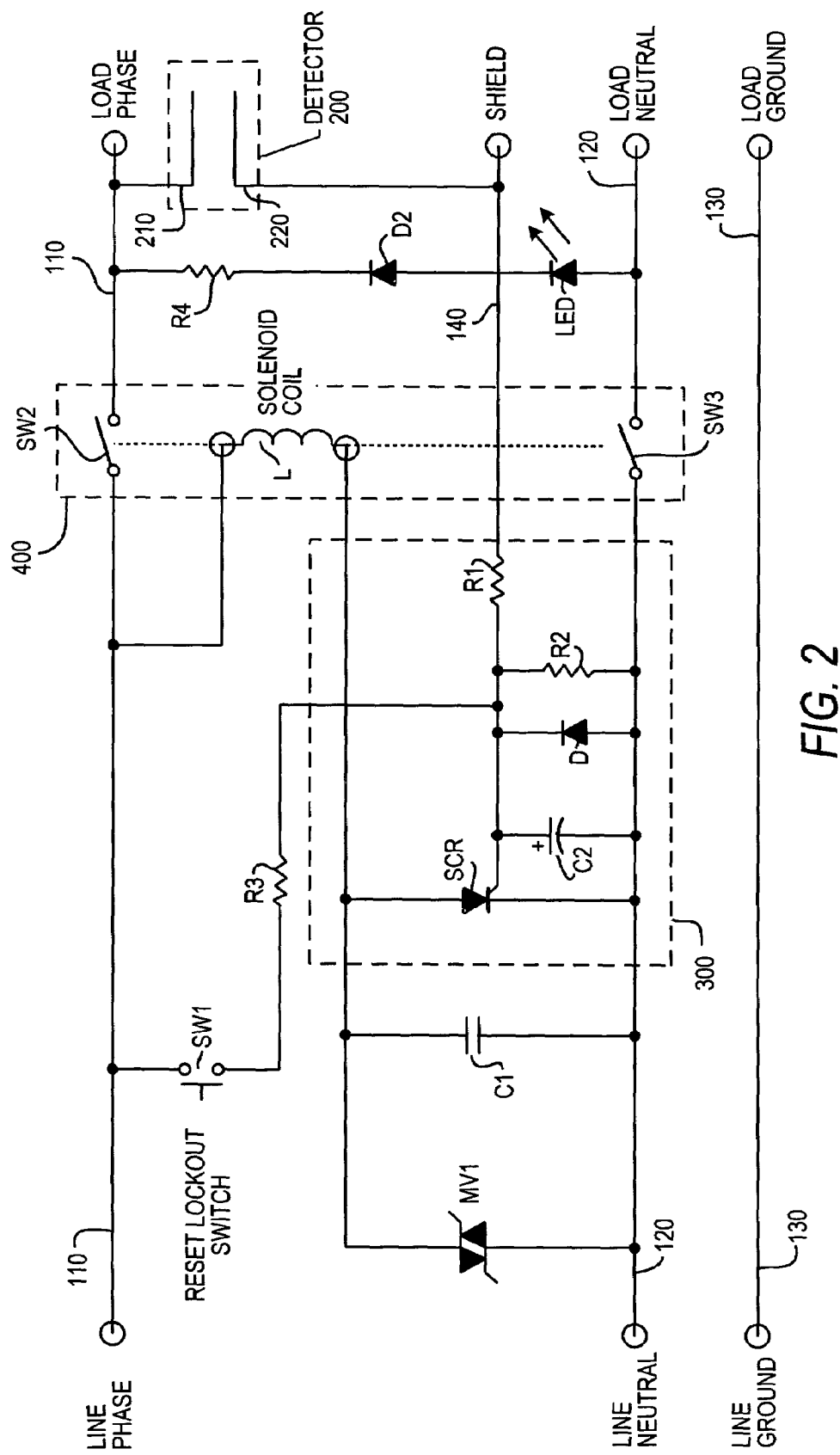
FIG. 2 is a diagram of an IDCI circuit with reset lockout, load power indication and voltage surge protection.

The electrical conductor 160 of FIG. 1 can be a single un-insulated wire which runs substantially parallel with but insulated from the other wires in the cord. FIG. 2 is a schematic diagram of the IDCI circuit in combination with additional circuitry to provide the following features: reset lockout, load power indication and voltage surge protection.

Reset lockout protection is provided through switch SW1 and resistor R3. Switch SW1 is normally open and closes when switches SW2 and SW3 are in the shock hazard open position and the reset button of the DCI is pressed. Current is supplied to the gate of the SCR through resistor R3. This causes the SCR to conduct allowing current through the energizing coil L. Firing the energizing coil removes an impediment from the path of the reset button opening SW1 once more and allowing switches SW2 and SW3 to be closed. This mechanism is described in more detail in U.S. Patent Pub. No. 20020003686 entitled IDCI With Reset Lockout And Independent Trip assigned to Leviton Manufacturing Co. Inc., and which is incorporated herein in its entirety by reference. The reset lockout function prevents SW2 and SW3 from being closed (reset) and supplying power to the load if the IDCI is non-functional or if an open neutral condition exists.

Figure 3:
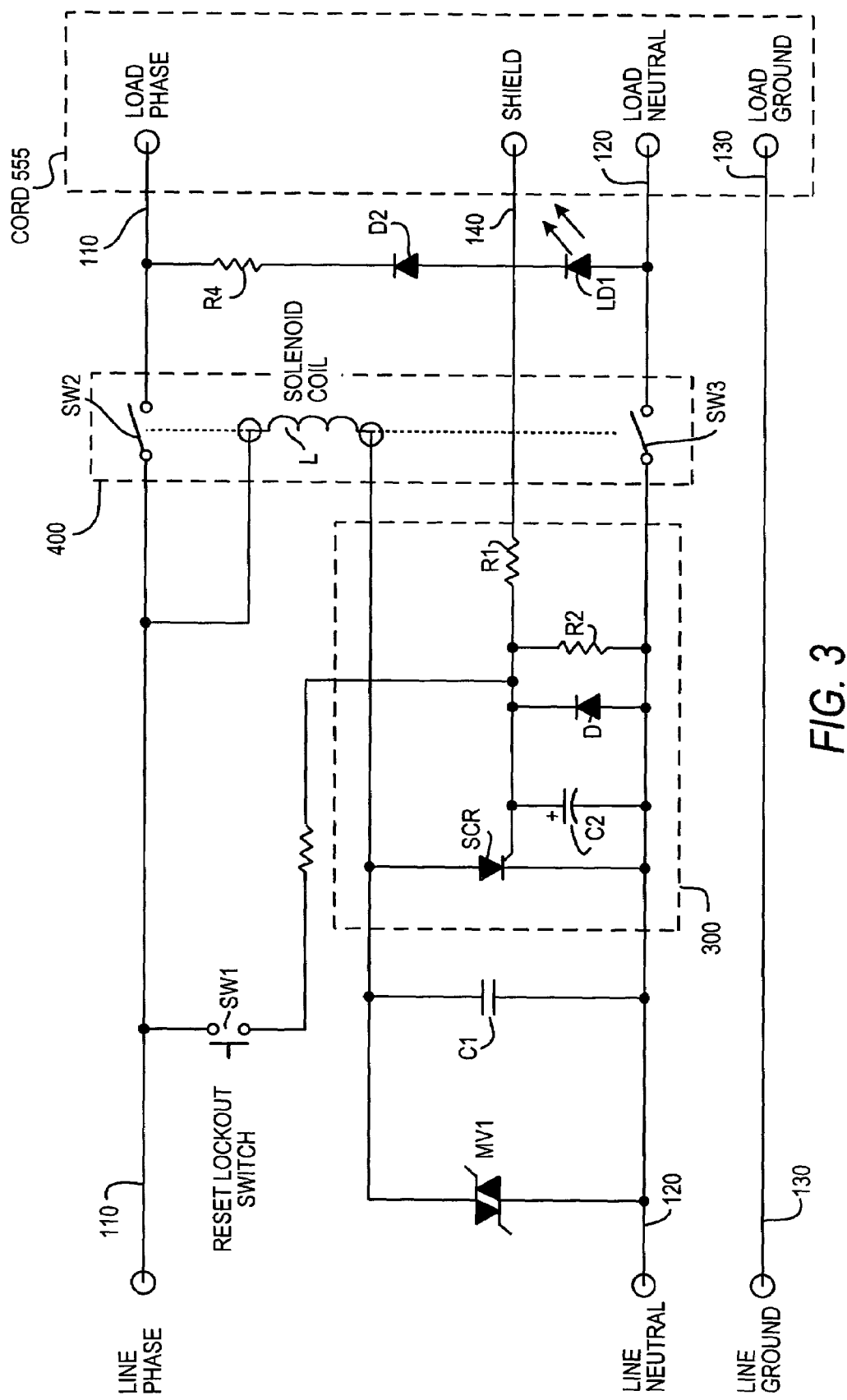
FIG. 3 is a diagram of an LCDI circuit located in the plug of an appliance or extension cord.

Load power indication is provided by an LED, supplied with rectified current by diode D2 and resistor R4, and utilizing load phase (110) and load neutral (120) as a power source. When the IDCI is plugged in, and switches SW2 and SW3 are closed, the LED is illuminated. If SW2 and SW3 are open, or the IDCI is unplugged, the LED is extinguished. Added protection from voltage surges on the AC line is provided by the capacitor C1 and the metal oxide varistor MV1. FIG. 3 is a schematic diagram of an LCDI with reset lockout. The schematic is similar to that of FIG. 2 except that the sense wire (160) has been replaced by a conductive shield 140.

In each embodiment of the invention here disclosed and illustrated in the Figs. subsequent to FIG. 2, the electrical conductor 140 is referred to as being a conductive shield which surrounds the various conductors of the cord. It is to be understood that the term conductive shield as used here after comprises either a shield which surrounds the various conductors in the extension cord, or one or more wires in substantially parallel relationship with the other wires in the cord, or one or more wires which surround the various wires in the extension cord or the equivalent.

Figure 13:
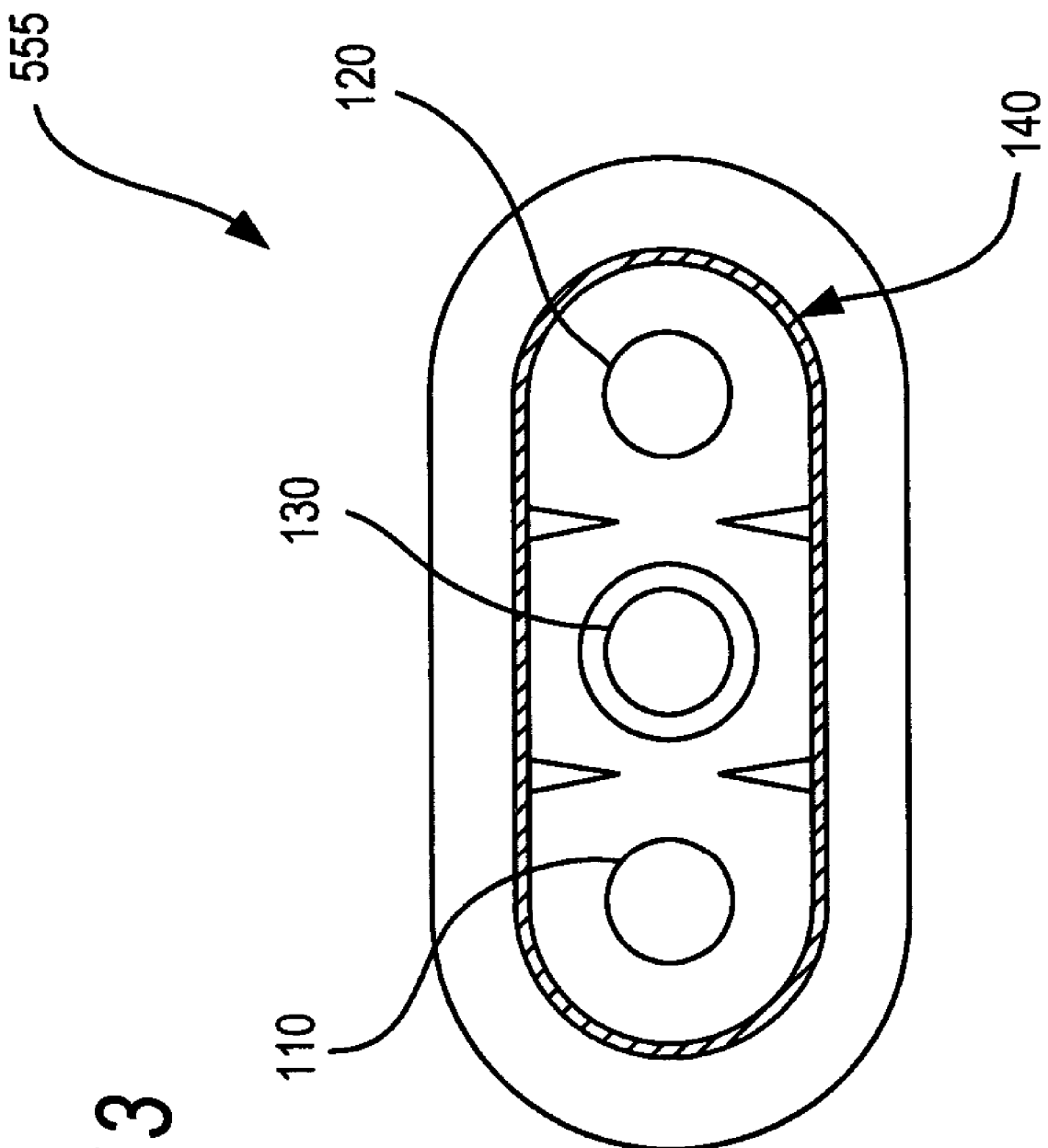
FIG. 13 is a sectional view of a flat shielded extension cord.

It is to be noted that the positioning of the shield relative to the conductors within a flat power cord can take various configurations which allows the circuit to be used to detect leakage current from the line wires of the power cord to the conductive shield. When leakage current is detected, switches SW2 and SW3 are opened and power is removed from the cord. In this way power is interrupted from a damaged cord before a fire can occur, Referring to FIG. 4, there is illustrated a schematic of an LCDI circuit located within a plug of an extension cord and having a shield integrity indicator in the extension cord receptacle. The circuit of FIG. 4 located within the plug is similar to the circuit of FIG. 2 without the sense conductors and includes an extension cord 555 completely enclosed within a shield 140 which connects plug 500 to receptacle 600 (see FIG. 13). Thus, located within the shield 140 are the phase conductor 110, the neutral conductor 120 and the ground conductor 130. The occurrence of leakage current from any one of the conductors within the shield will be detected by the shield which, through the action of control circuit 300 and interrupter circuit 400 of the LCDI circuit in the plug 500 will operate to interrupt the flow of current through the plug to the extension cord 555. An LED 502 which may emit a green light is located within the receptacle to verify the conductivity of the shield and that protection is available during the negative half cycle of the AC signal of phase conductor 110. Current flows through the LED 502, diode D3 and resistor RS, illuminating the LED while the SCR is incapable of firing. During the positive half cycle diode D3 blocks the current so that the SCR is not fired inadvertently. The shield integrity indicator 502 may be used as a replacement for the load power indicator LDI since it is only illuminated when there is power to the load.

Figure 4:
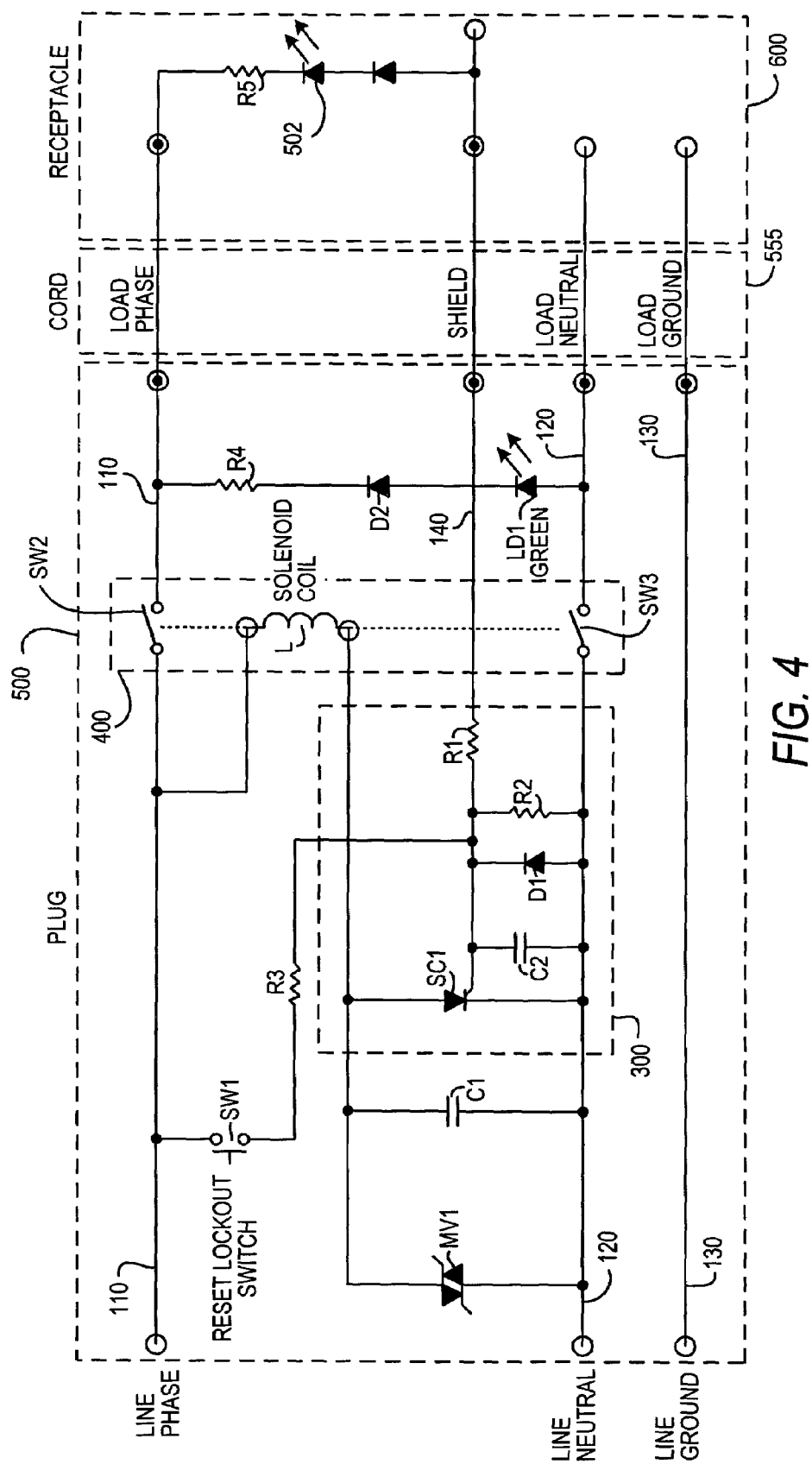
FIG. 4 is a schematic of an LCDI circuit located in the plug of an extension cord and having a shield integrity indicator in the receptacle of the extension cord in accordance with the principles of the invention.
Figure 5:
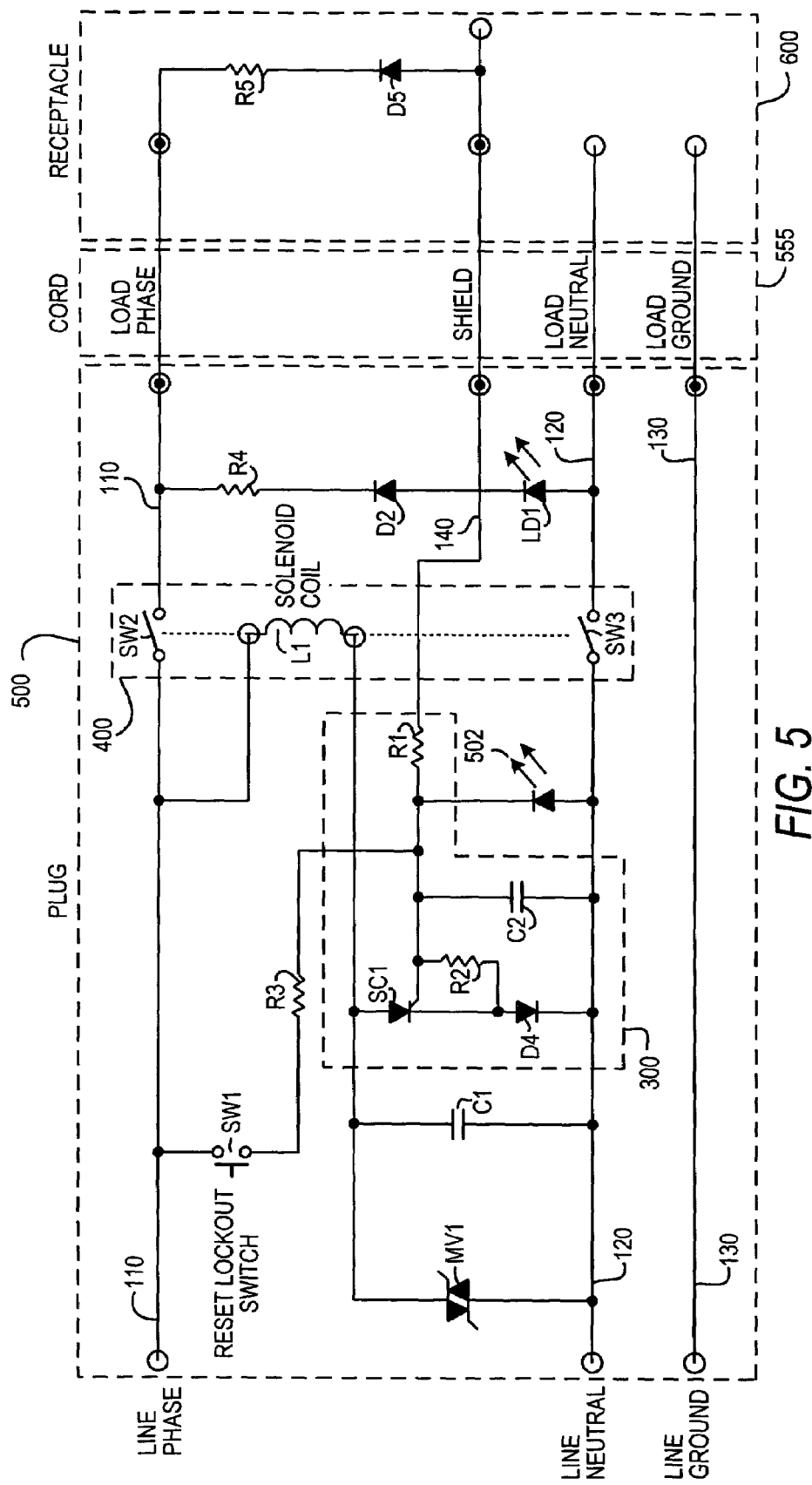
FIG. 5 is a schematic of an LCDI circuit located in the plug of an extension cord and having a shield integrity indicator in the plug of the extension cord in accordance with the principles of the invention.
Figure 6:
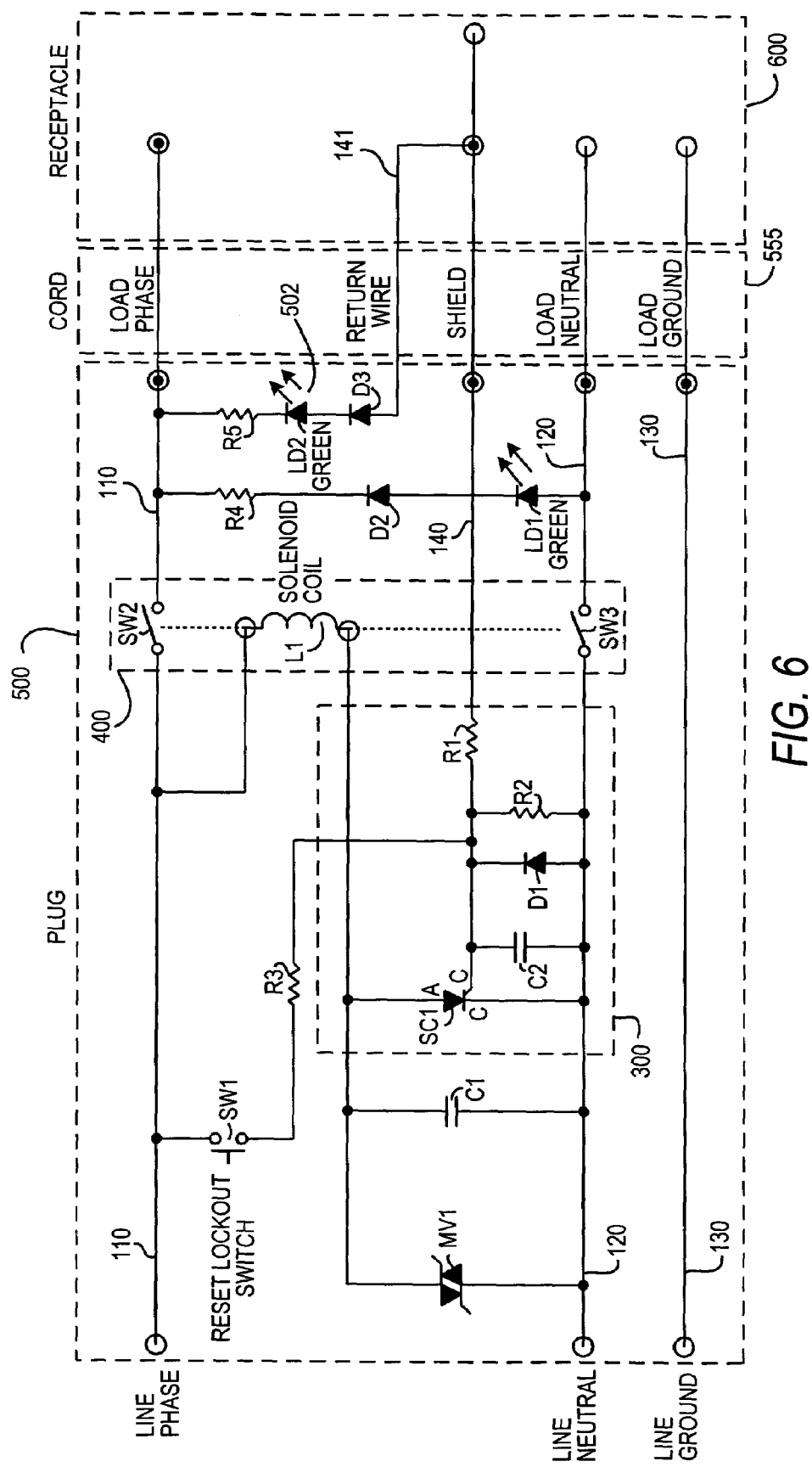
FIG. 6 is a schematic of an LCDI circuit located in the plug of an extension cord and having a shield integrity indicator in the plug and a return wire in the cord in accordance with the principles of the invention.

FIGS. 5 and 6 show alternative embodiments of the shield integrity indicator where the indicating LED is located in the plug of the extension cord. The operation of the LCDI circuit and the shield integrity indicator in both FIGS. 5 and 6 is similar to that of FIG. 4 and, therefore, is not repeated here. In each instance, current flows through the shield integrity indicator 502 during the negative half cycle of the AC signal and is blocked during the positive half cycle. The circuit of FIG. 6 utilizes a return wire 141 which may or may not be insulated from the shield throughout the length of the power cord 555.

Figure 7:
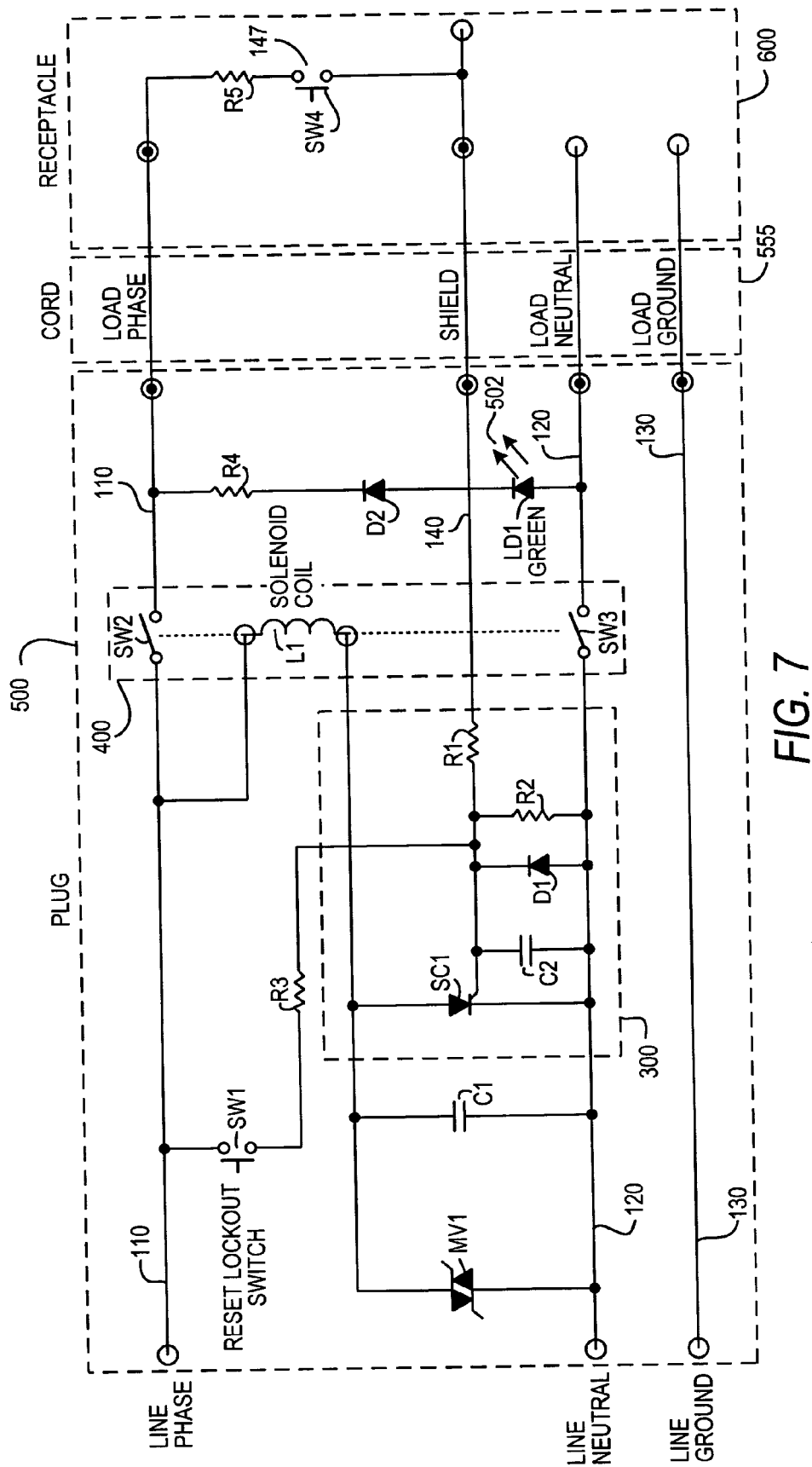
FIG. 7 is a schematic of an LCDI circuit located in the plug of an extension cord and having a shield integrity test switch in the receptacle of the extension cord in accordance with the principles of the invention.

A test button can be provided to test the continuity of the shield and to verify proper circuit operation. Referring to FIG. 7, a test circuit comprising a resistor R6 in series with a normally open switch 147 is connected between the load phase conductor 110 and the shield 140. Closing the switch creates leakage current from load phase 110 through the shield 140 to the detecting circuit 300. The AC source will be operatively disconnected from the extension cord and the load indicator 502 will be extinguished. If the load indicator 502 remains lit, this shows that the test has failed. FIG. 7 is a schematic of an LCDI circuit located in the plug of an extension cord having a shield integrity test switch in the extension cord receptacle.

Figure 8:
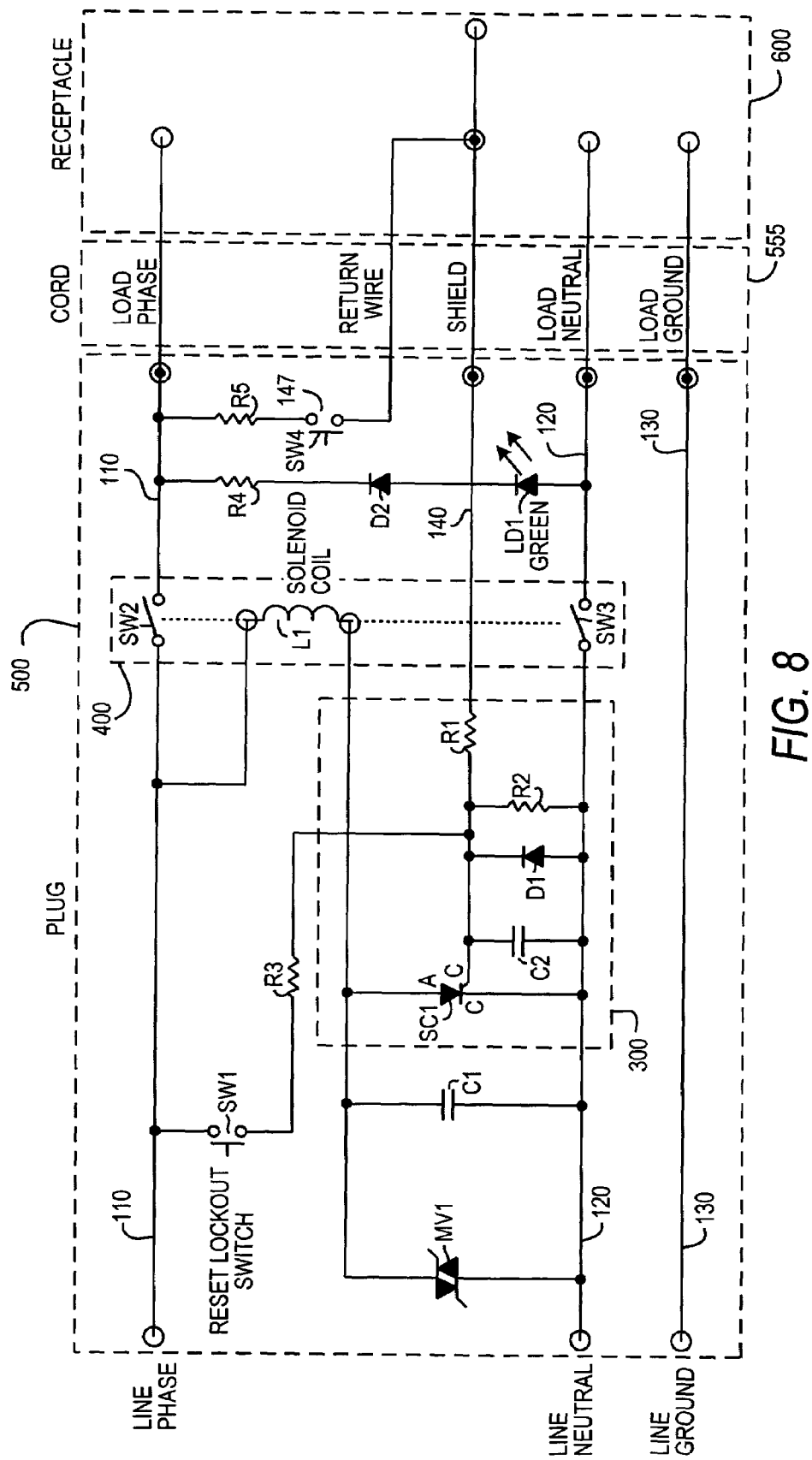
FIG. 8 is a schematic of an LCDI circuit located in the plug of an extension cord and having a shield integrity test switch in the plug in accordance with the principles of the invention.

FIG. 8 is a schematic of an LCDI circuit located in the plug of an extension cord having a shield integrity test switch in the plug. The operation of the LCDI circuit of both FIGS. 7 and 8 is similar to that of FIG. 4 and, therefore, in not repeated here. A shield integrity switch can be used in conjunction with a shield integrity indicator since they work independently of each other. With the circuit of FIG. 8 it is possible to combine the operation of the reset lockout switch and the shield integrity switch such that the LCDI operation and shield integrity are tested before the LCDI can be reset.

Figure 9:
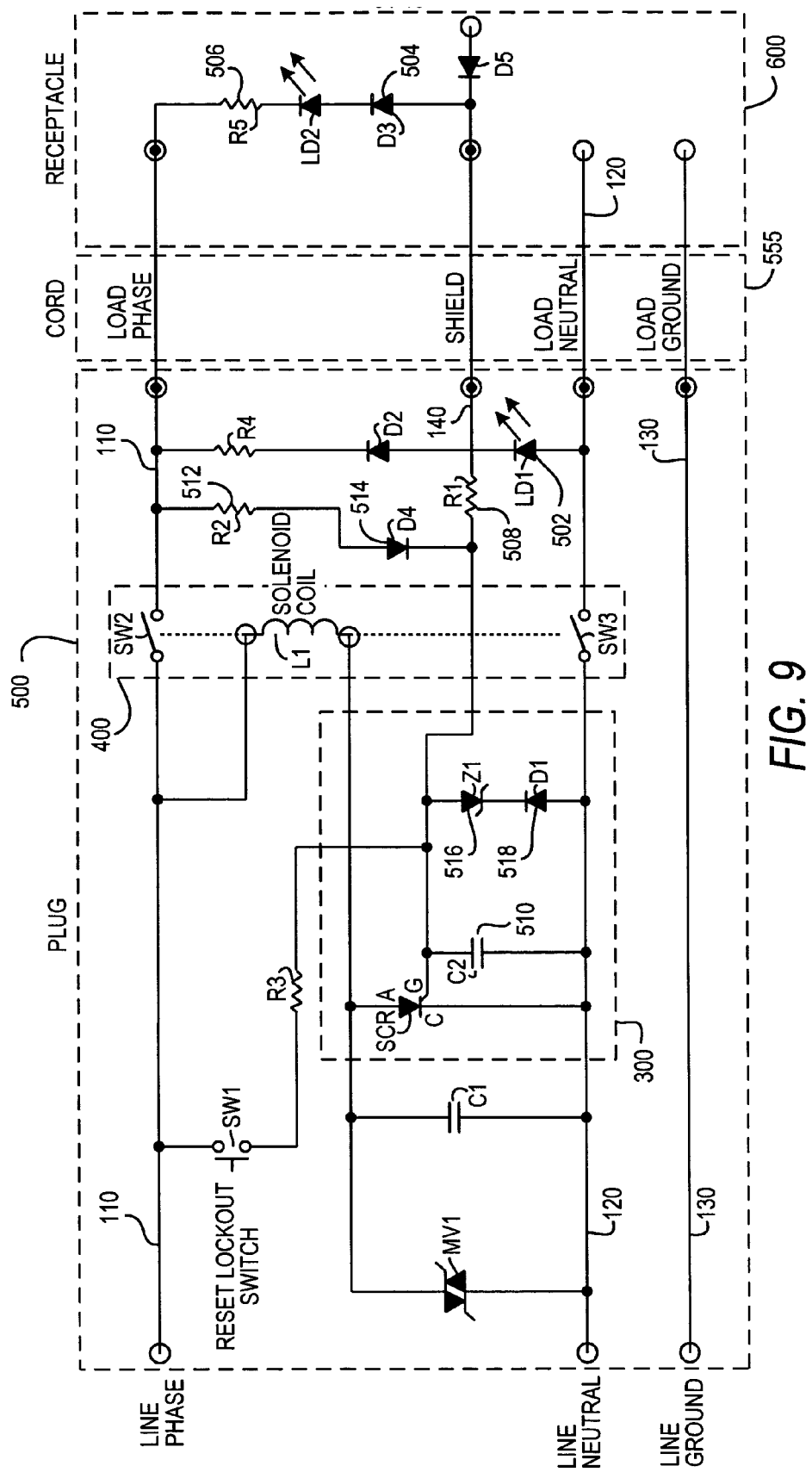
FIG. 9 is a schematic of an LCDI circuit located in a plug of an extension cord and having an integrity indicator for shield and phase wire continuity in accordance with the principles of the invention.

A leakage current detector interrupter circuit located in the plug of an extension cord having shield and phase conductor integrity indicator is illustrated in FIG. 9. The operation of the circuit illustrated in FIG. 9 is described in U.S. Pat. No. 6,016,244 which is incorporated in this application by reference in its entirety. In FIG. 9, it is assumed that the shield 140 is intact and that it is energized. During the negative half cycle of the AC signal on phase conductor 110, a negative charging path via diode 504, resistor 506, shield 140 and resistor 508 provides a charge to capacitor 510, thereby charging it negatively. During the positive half cycle, diode 504 blocks, however a positive charging path via resistor 512 and diode 514 provides a charge to capacitor 510 thereby charging it positively. The time constant of resistor 506 and capacitor 510 is roughly 33 times greater than the time constant of resistor 512 and capacitor 510 and, therefore, the capacitor 510 charges much faster in the negative sense. Therefore, under steady state conditions a negative voltage exists on the gate of the SCR to keep it in a non-conductive state. In order to limit the negative voltage to a value that will not damage the gate-to-cathode junction of the SCR, a three volt zener diode 516 is added in series with diode 518 and in parallel with capacitor 510.

It is now assumed that the shield 140 is broken. Under this condition a negative charging path no longer exists for the negative voltage to be impressed of capacitor 510 and, therefore, during positive half cycles capacitor 510 will be charged more and more positively. Eventually the voltage on the gate of the SCR will get high enough to trip the SCR, causing it to switch to the conducting state thereby operatively disconnecting the AC source from the extension cord. As in FIGS. 4, 5 and 6, the LED 502 operates as a shield integrity and/or load power indicator.

Figure 10:
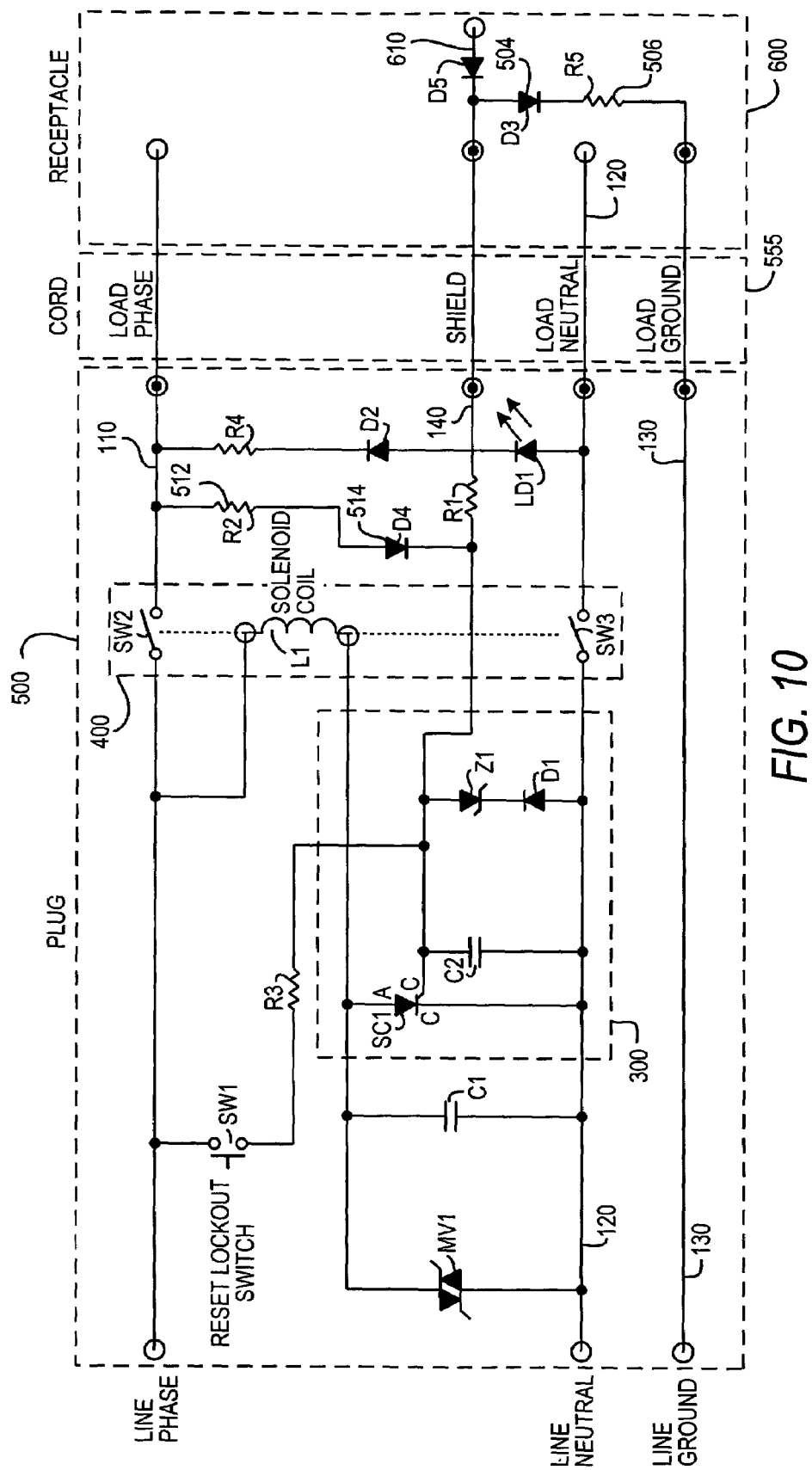
FIG. 10 is a schematic of an LCDI circuit located in a plug of an extension cord and having an integrity indicator for shield and ground wire continuity in accordance with the principles of the invention.

Referring to FIG. 10, there is shown the circuit of FIG. 9 modified to provide an LCDI circuit located in the plug of an extension cord with an integrity indicator for shield and ground wire continuity. The operation of the circuit of FIG. 10 is similar to that of FIG. 9 and, therefore, is not here repeated. If either the shield or ground is broken, the LCDI will trip, removing power from the load.

Figure 11:
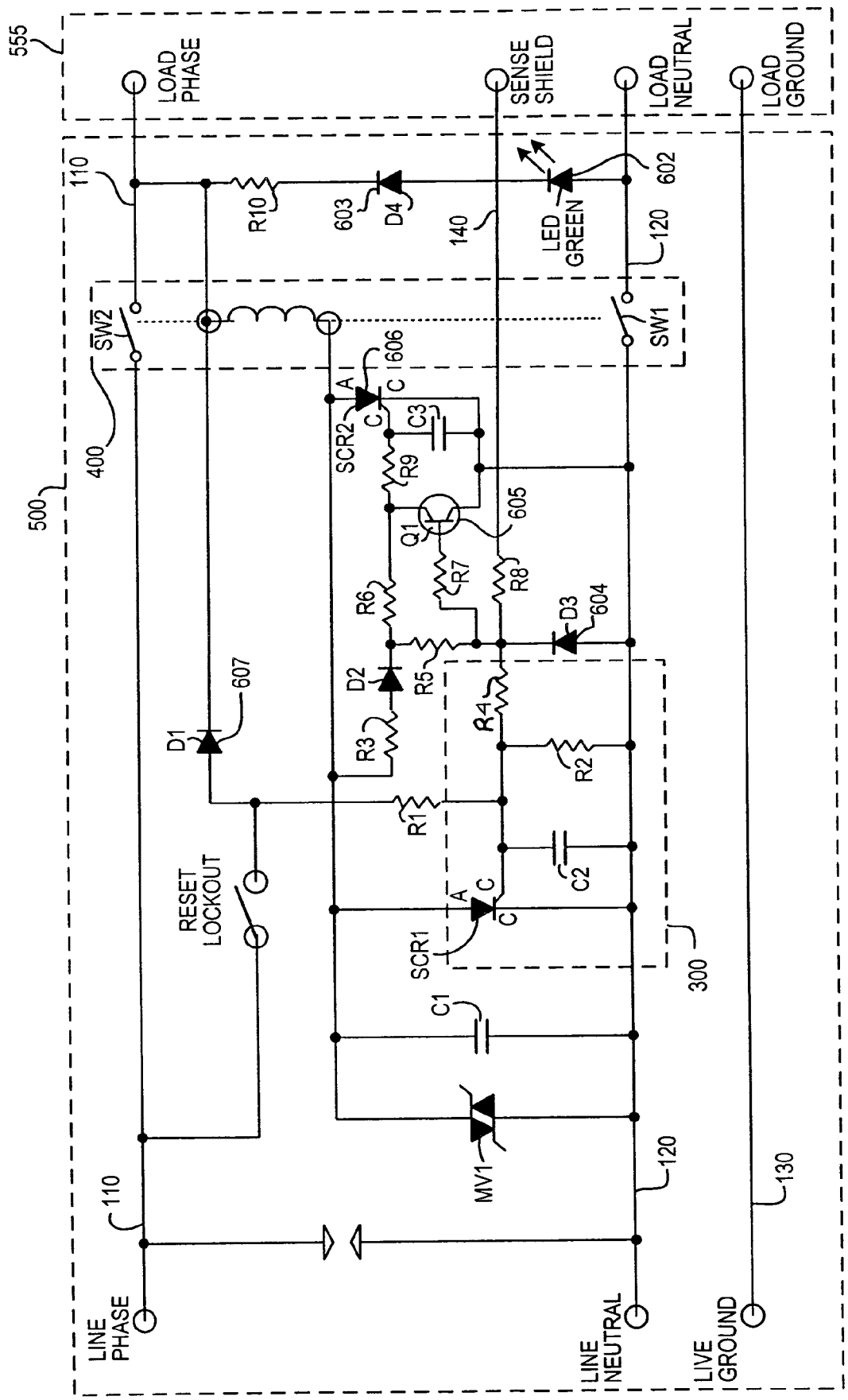
FIG. 11 is a schematic of an LCDI circuit located in the plug of an extension cord which trips when there is a short between the neutral and/or ground conductors and the shield conductor in accordance with the principles of the invention.

Referring to FIG. 11, there is shown an LCDI circuit located in the plug of an extension cord with trip occurring when there is a low impedance between neutral, and/or ground conductors and the shield conductor. In this embodiment, the detection circuitry in the plug 500, detects leakage current from the load phase conductor 110 or low impedance between the neutral and/or ground and the shield. Upon detection of one or these faults the circuit 400 in the plug interrupts the flow of current to the extension cord that an unsafe condition has occurred. An LED indicator 602 located in the plug provides an indication of load power or a shield integrity indicator 502 as in FIGS. 4, 5 and 6 provides an indication of shield integrity and/or load power. In addition, a test button (not shown) as in FIGS. 7 and 8 can be provided to test the continuity of the shield and to verify that the circuit is operating properly. The basic principle of operation of the circuit relies on the shield being biased to a predetermined voltage by resistors R3, R5, R4 and R2. When the impedance between neutral or ground and the shield decreases, the voltage drops below a predetermined threshold voltage. The transistor 605 is then turned off and the SCR 606 gate is allowed to trigger, thus latching the SCR to its on state. This allows current to flow in the coil and trip the relay in the interrupter circuit 400 to disconnect the source of current from the load.

The schematic of FIG. 11 shows the trip coil L being powered by load phase 110 rather than line phase.

This is because the ground wire is present in the embodiment shown. If the impedance between the shield 140 and ground 130 is lowered to a point that the SCR 606 fires, then SW2 and SW3 will open, disconnecting line phase from load phase and line neutral from load neutral. However, line ground is not disconnected from load ground. If the trip coil was powered from line phase, the SCR 606 would continue to fire, the trip coil L is not rated for continuous duty and would fail. As it is powered from load phase, the trip coil is turned off when S2 opens. As the trip coil is powered from the load phase, an additional diode 607 is required to power the trip coil L during the reset lockout function.

With a 2 wire power cord (phase and neutral), the trip coil will be powered from line phase and diode 607 can be removed since the fault will always be removed when S2 and S3 are opened.

Figure 12:
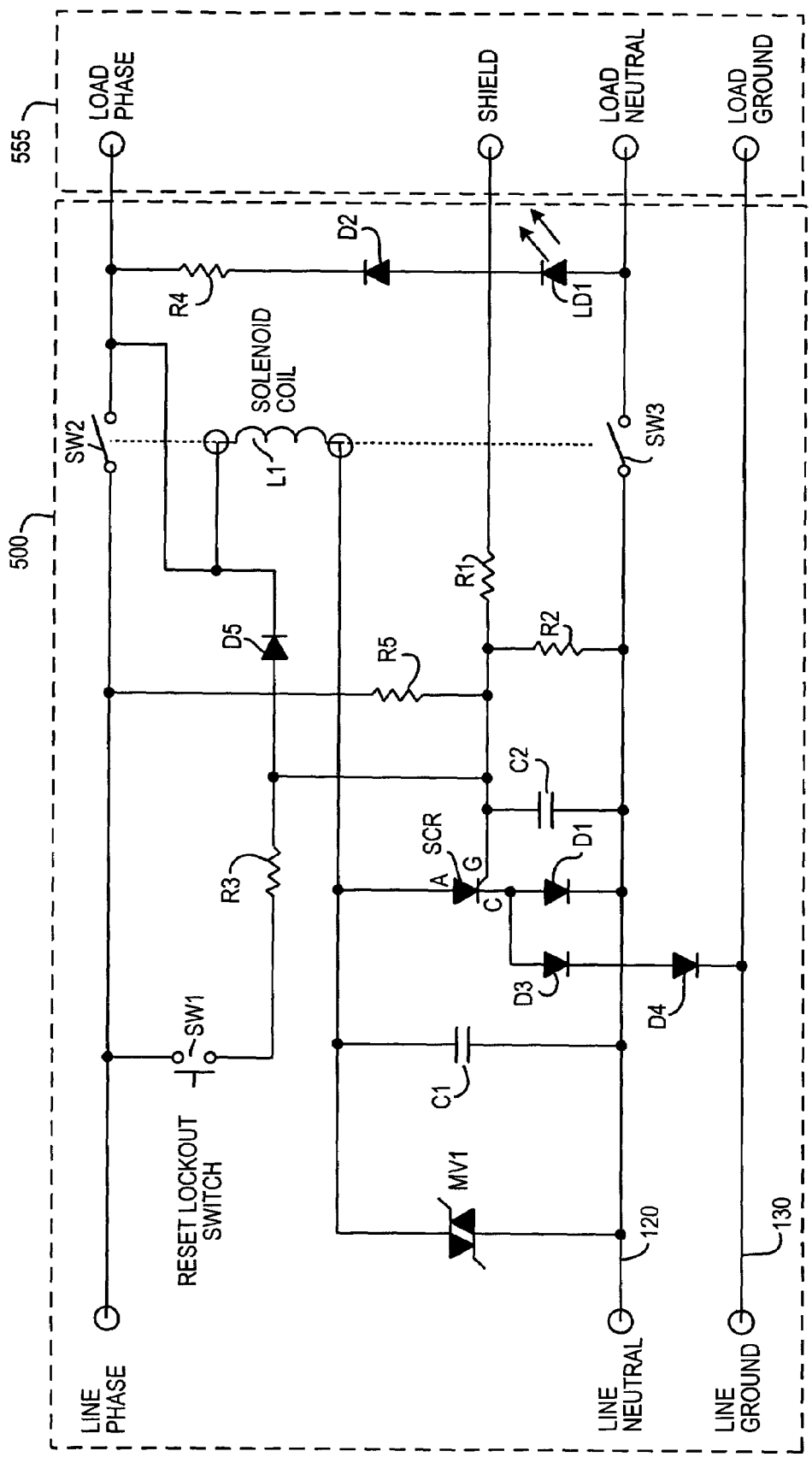
FIG. 12 is a schematic of an LCDI (or IDCI) circuit located in the plug of an extension cord which has the ability to trip during an open-neutral condition by utilizing diodes and the ground wire as a return path for the solenoid coil.

FIG. 12 is a schematic of an LCDI (or IDCI) circuit located in the plug of an extension cord which has the ability to trip during an open neutral condition. In the previously shown embodiments of IDCI and LCDI circuits, the neutral conductor is utilized as the return path for the trip coil when a fault condition occurs. But when the neutral conductor is broken between the AC source and the plug, there is no return path to fire the coil to disconnect the AC source from the extension cord. In FIG. 12, the resistor divider formed by R5 and R2 is designed to provide a gate voltage that is below the trigger voltage of the SCR. But if line neutral is broken anywhere between the service entrance panel and the plug of the LCDI, R2 will appear as an open circuit. The SCR will conduct through the solenoid coil, L1, the SCR and diodes D3 and D4 to line ground 130. The trip coil is connected to the load phase. When the device trips, power is removed from the coil. As there is a two diode voltage drop to ground, in normal operation with a neutral connection, the SCR will conduct to neutral through D1 with no current flow to ground.

With the exception of the circuits in FIGS. 10 and 12, the IDCI and LCDI circuits work independently of ground. Thus, they can be used with a two wire power cord (phase and neutral) as well as a three wire power cord (phase, neutral and ground).

In each embodiment here disclosed, the inclusion of an immersion detector, shown as 610 in the receptacle will provide the extension cord with immersion protection. This is described in more detail in U.S. Pat. No. 6,176,717 assigned to Leviton Manufacturing Co. Inc. and incorporated herein in its entirety by reference While there have been shown and described and pointed out the fundamental novel features of the invention as applied to the various embodiments, as is presently contemplated for carrying them out, it will be understood that various omissions and substitutions and changes of the form and details of the device illustrated and in its operation may be made by those skilled in the art, without departing from the spirit of the invention.

What is claimed is:

1. An electrical extension cord comprising:
    an electrical cable having first and second ends including separate, insulated phase and neutral conductors surrounded by a conductive sensing shield wherein said cable is electrically connected at first ends of the phase and neutral conductors and conductive sensing shield to a plug having phase and neutral blades,
    a receptacle connected to the second end of the cable,
    a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades and wherein leakage current collected by the shield enables operation of the fault circuit interrupter to electrically disconnect the receptacle from the plug if an unsafe condition should arise, and
    a switch located in the receptacle for testing the integrity of the extension cord.

2. The electrical extension cord of claim 1, wherein the switch in the receptacle is used to test for shield continuity.

3. The electrical extension cord of claim 1, wherein the switch in the receptacle tests the fault circuit interrupter by simulating a leakage condition in the extension cord.

4. An electrical extension cord comprising:
    an electrical cable having first and second ends including separate, insulated phase and neutral conductors surrounded by a conductive sensing shield wherein said cable is electrically connected at first ends of the phase and neutral conductors and conductive sensing shield to a plug having phase and neutral blades,
    a receptacle connected to the second end of the cable, and
    a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades and wherein leakage current collected by the shield enables operation of the fault circuit interrupter to electrically disconnect the receptacle from the plug should the shield become discontinuous.

5. An electrical extension cord comprising:
an electrical cable having first and second ends including separate, insulated phase and neutral conductors surrounded by a conductive sensing shield wherein said cable is electrically connected at first ends of the phase and neutral conductors and conductive sensing shield to a plug having phase and neutral blades,
a receptacle connected to the second end of the cable,
a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades and wherein leakage current collected by the shield enables operation of the fault circuit interrupter to electrically disconnect the receptacle from the plug wherein the extension cord contains a light located in the plug of the extension cord which denotes if the extension cord is safe to use, and
a switch located in the plug for testing the integrity of the extension cord.

6. The electrical extension cord of claim 5, wherein the switch in the plug is used to test for shield continuity.

7. The electrical extension cord of claim 5, wherein the switch in the plug tests the fault circuit interrupter by simulating a leakage condition in the extension cord.

8. An electrical extension cord comprising:
an electrical cable including separate, insulated phase and neutral conductors surrounded by a conductive shield wherein said cable is electrically connected at first ends of the phase and neutral conductors and conductive shield to a receptacle,
an electrical plug comprising a plug housing, phase and neutral plug blades,
a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades, and
impedance sensing means coupled to operate the fault circuit interrupter to electrically disconnect the receptacle from the plug upon the detection of an impedance between the shield and neutral conductors of less than a predetermined value.

9. An electrical extension cord comprising:
an electrical cable including separate, insulated phase and neutral conductors surrounded by a conductive shield wherein said cable is electrically connected at first ends of the phase and neutral conductors and conductive shield to a receptacle,
an electrical plug comprising a plug housing, phase and neutral plug blades,
a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades, and
impedance sensing means coupled to operate the fault circuit interrupter to electrically disconnect the receptacle from the plug upon the detection of an impedance between the shield and a ground of less than a predetermined value.

10. The electrical extension cord of claim 9 wherein the electrical cable is a flat cord.

11. The electrical extension cord of claim 9 wherein the electrical cable is a flat cord which includes a ground conductor.

12. An electrical extension cord comprising:
an electrical cable including separate, insulated phase and neutral conductors surrounded by a conductive shield wherein said cable is electrically connected at first ends of the phase and neutral conductors and conductive shield to a receptacle,
an electrical plug comprising a plug housing, phase and neutral plug blades,
a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades, and
tripping means coupled to operate the fault circuit interrupter to electrically disconnect the receptacle from the plug upon the opening of the shield conductor.

13. The electrical extension cord of claim 12 wherein the electrical cable is a flat cord.

14. The electrical extension cord of claim 12 wherein the electrical cable is a flat cord which includes a ground conductor.

15. An electrical extension cord comprising:
an electrical cable including separate, insulated phase and neutral conductors surrounded by a conductive sensing shield wherein said cable is electrically connected at first ends of the phase and neutral conductors and conductive sensing shield to a receptacle,
an electrical plug comprising a plug housing, phase and neutral plug blades,
a fault circuit interrupter wherein the fault circuit interrupter is electrically connected at load end phase, neutral and shield ports to the cable at second ends of the phase, neutral and shield conductors, and at line end phase and neutral ports to the phase and neutral plug blades wherein leakage current collected by the shield enables operation of the fault circuit interrupter to electrically disconnect the receptacle from the plug, and
an integrity indicator located in the plug or receptacle to verify the conductivity of the shield conductor and that protection by said fault circuit interrupter is available during negative half cycles of an AC signal on the phase conductor.

* * * * *